United States Patent
Kondo

(10) Patent No.: US 11,872,964 B2
(45) Date of Patent: Jan. 16, 2024

(54) VEHICLE CLEANER UNIT AND SIDE TURN SIGNAL LAMP WITH CAMERA

(71) Applicant: KOITO MANUFACTURING CO., LTD., Tokyo (JP)

(72) Inventor: Masayuki Kondo, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 249 days.

(21) Appl. No.: 16/642,670

(22) PCT Filed: Aug. 10, 2018

(86) PCT No.: PCT/JP2018/030117
§ 371 (c)(1),
(2) Date: Feb. 27, 2020

(87) PCT Pub. No.: WO2019/044466
PCT Pub. Date: Mar. 7, 2019

(65) Prior Publication Data
US 2020/0198592 A1    Jun. 25, 2020

(30) Foreign Application Priority Data

Aug. 30, 2017 (JP) .................................. 2017-165450
Aug. 30, 2017 (JP) .................................. 2017-165451

(51) Int. Cl.
*B60S 1/56* (2006.01)
*B60S 1/60* (2006.01)
(Continued)

(52) U.S. Cl.
CPC .................. *B60S 1/56* (2013.01); *B60Q 1/34* (2013.01); *B60Q 1/38* (2013.01); *B60R 11/04* (2013.01); *B60S 1/60* (2013.01); *B60S 3/008* (2013.01)

(58) Field of Classification Search
CPC ...... B60S 1/46; B60S 1/48; B60S 1/54; B60S 1/56; B60S 1/563; B60S 1/60; B60S 1/603
See application file for complete search history.

(56) References Cited

U.S. PATENT DOCUMENTS 5,736,677 A * 4/1998 Sato ..................... H02G 3/22
                                                174/152 G
6,231,081 B1 * 5/2001 Berke ..................... B60S 9/02
                                                254/419
(Continued)

FOREIGN PATENT DOCUMENTS

JP        58-97508 A       6/1983
JP      2002-161943 A      6/2002
(Continued)

OTHER PUBLICATIONS

JP2010007481A Machine Translation (Year: 2010).*
(Continued)

*Primary Examiner* — Spencer E. Bell
(74) *Attorney, Agent, or Firm* — Sughrue Mion, PLLC

(57) ABSTRACT

This vehicle cleaner unit is provided with: a cylinder unit comprising a cylinder which forms a chamber, a discharge port through which the chamber opens to the outside, and a piston which reciprocates inside of the cylinder and discharges from the discharge port a cleaning medium inside of the chamber; a power unit comprising a motor, a power transmission mechanism which transmits rotary motion of the motor to the piston to cause the piston to reciprocate, and a housing which houses the motor and the power transmission mechanism; and a casing which houses the cylinder unit and the power unit. The cylinder unit and the power unit are supported by the casing with rubber members interposed therebetween.

3 Claims, 11 Drawing Sheets

(51) Int. Cl.
  *B60Q 1/34* (2006.01)
  *B60R 11/04* (2006.01)
  *B60S 3/00* (2006.01)
  *B60Q 1/38* (2006.01)

(56) References Cited

U.S. PATENT DOCUMENTS

| | | |
|---|---|---|
| 2003/0107163 A1 | 6/2003 | Asano et al. |
| 2003/0202096 A1 | 10/2003 | Kim |
| 2013/0174368 A1* | 7/2013 | Mildner .................. B60S 1/349 15/250.31 |
| 2013/0313787 A1 | 11/2013 | Fujiki |
| 2015/0000974 A1 | 1/2015 | Shiga et al. |
| 2015/0078940 A1* | 3/2015 | Kikuta ..................... B60S 1/56 417/432 |
| 2018/0021665 A1* | 1/2018 | Su ........................ A63C 17/015 280/11.28 |
| 2018/0105101 A1 | 4/2018 | Tatara et al. |
| 2018/0186341 A1 | 7/2018 | Kimura et al. |
| 2018/0194331 A1 | 7/2018 | Kubota et al. |
| 2019/0219043 A1 | 7/2019 | Kikuta et al. |
| 2019/0375378 A1 | 12/2019 | Nezu |

FOREIGN PATENT DOCUMENTS

| | | |
|---|---|---|
| JP | 2003-240036 A | 8/2003 |
| JP | 2003-312359 A | 11/2003 |
| JP | 2009-83730 A | 4/2009 |
| JP | 2010-7481 A | 1/2010 |
| JP | 2012-191822 A | 10/2012 |
| JP | 2013-173407 A | 9/2013 |
| JP | 2015-83830 A | 4/2015 |
| WO | 2016152682 A1 | 9/2016 |
| WO | 2017/002688 A1 | 1/2017 |
| WO | 2017002877 A1 | 1/2017 |
| WO | 2018/135322 A1 | 7/2018 |

OTHER PUBLICATIONS

Partial Supplementary European Search Report dated Jun. 23, 2021, issued by the European Patent Office in counterpart European patent Application No. 18849845.5.
International Search Report (PCT/ISA/210) dated Nov. 6, 2018, issued by the International Searching Authority in counterpart International Application No. PCT/JP2018/030117.
Written Opinion (PCT/ISA/237) dated Nov. 6, 2018, issued by the International Searching Authority in counterpart International Application No. PCT/JP2018/030117.

* cited by examiner

VEHICLE CLEANER UNIT AND SIDE TURN SIGNAL LAMP WITH CAMERA

CROSS-REFERENCE TP RELATED APPLICATION

This is a National Stage Application of Application No. PCT/JP2018/030117 filed Aug. 10, 2018, claiming priority based on Japanese Patent Application Nos. 2017-165450 and 2017-165451 filed Aug. 30, 2017, the contents of all of whih are incorporated herein by reference in their entirety.

TECHNICAL FIELD

The present invention relates to a vehicle cleaner unit configured to clean a to-be-cleaned object.

The present invention relates to a side turn signal lamp with a camera.

BACKGROUND ART

A vehicle air cleaner configured to eject air toward a to-be-cleaned object by causing a piston to reciprocate inside of a cylinder is known in PTL 1 and the like.

Also, a side turn signal lamp with a camera on which a camera is mounted is known in PTL 1 and the like.

CITATION LIST

Patent Literature

PTL 1: JP-A-2003-312359

SUMMARY OF INVENTION

Technical Problem

When vibrations generated as a result of the reciprocation of the piston are transmitted to a nozzle, a relative position relation between the nozzle and the to-be-cleaned object is likely to deviate. When the relative position relation deviates, the air ejected from the nozzle deviates from a targeted region of the to-be-cleaned object.

It is therefore an object of the present invention to provide a vehicle cleaner unit in which vibrations are suppressed.

Also, when mounting the side turn signal lamp with a camera to a vehicle capable of driving automatically, it is also required to mount a cleaner configured to clean the camera.

Therefore, the present invention provides a side turn signal lamp with a camera on which a cleaner configured to clean the camera is mounted.

Solution to Problem

A vehicle cleaner unit in accordance with an aspect of the present invention includes:

a cylinder unit including a cylinder configured to form therein a chamber, a discharge port through which the chamber communicates with an outside, and a piston configured to reciprocate inside of the cylinder to discharge from the discharge port a cleaning medium inside of the chamber;

a power unit including a motor, a power transmission mechanism configured to rotary motion of the motor to the piston to cause the piston to reciprocate, and a housing configured to house therein the motor and the power transmission mechanism; and a casing configured to house the cylinder unit and the power unit, wherein the cylinder unit and the power unit are supported to the casing with a rubber member being interposed therebetween.

In the vehicle cleaner unit, the rubber member may be provided on both one side and the other side of the piston in a reciprocation direction in which the piston is to reciprocate.

In the vehicle cleaner unit, the rubber member may have:

a large-diameter part attached to the casing, a small-diameter part attached to the cylinder unit or the power unit, and a connection part configured to interconnect the large-diameter part and the small-diameter part, and, stiffness of the connection part may smaller than stiffness of the large-diameter part and stiffness of the small-diameter part.

In the vehicle cleaner unit, a conduit tube through which a wiring extending from the motor is to pass may be inserted in the rubber member.

A side turn signal lamp with a camera in accordance with an aspect of the present invention includes:

a light source unit including a light source, and a light guide body on which light generated from the light source is to be incident;

a camera unit including a camera lens and an imaging element;

a cleaner unit including a cleaning medium delivery part through which a cleaning medium is to be discharged toward the camera lens; and a base frame having integrally a light source attachment part to which the light source unit is attached, a camera attachment part to which the camera unit is attached, and a cleaner attachment part to which the cleaner unit is attached.

In the side turn signal lamp with a camera, the base frame may be provided with a tube path configured to guide the cleaning medium from the cleaning medium delivery part toward the camera lens.

In the side turn signal lamp with a camera, a cover member configured to cover at least a part of at least one of the light source unit and the base frame may be provided.

In the side turn signal lamp with a camera, the camera lens may be fixed to the cover member, and the cover member may be provided with a nozzle configured to discharge the cleaning medium toward the camera lens.

Advantageous Effects of Invention

According to the present invention, the vehicle cleaner unit in which vibrations are suppressed is provided.

According to the present invention, the side turn signal lamp with a camera on which the cleaner configured to clean the camera is mounted is provided.

DESCRIPTION OF EMBODIMENTS

Figure 1:
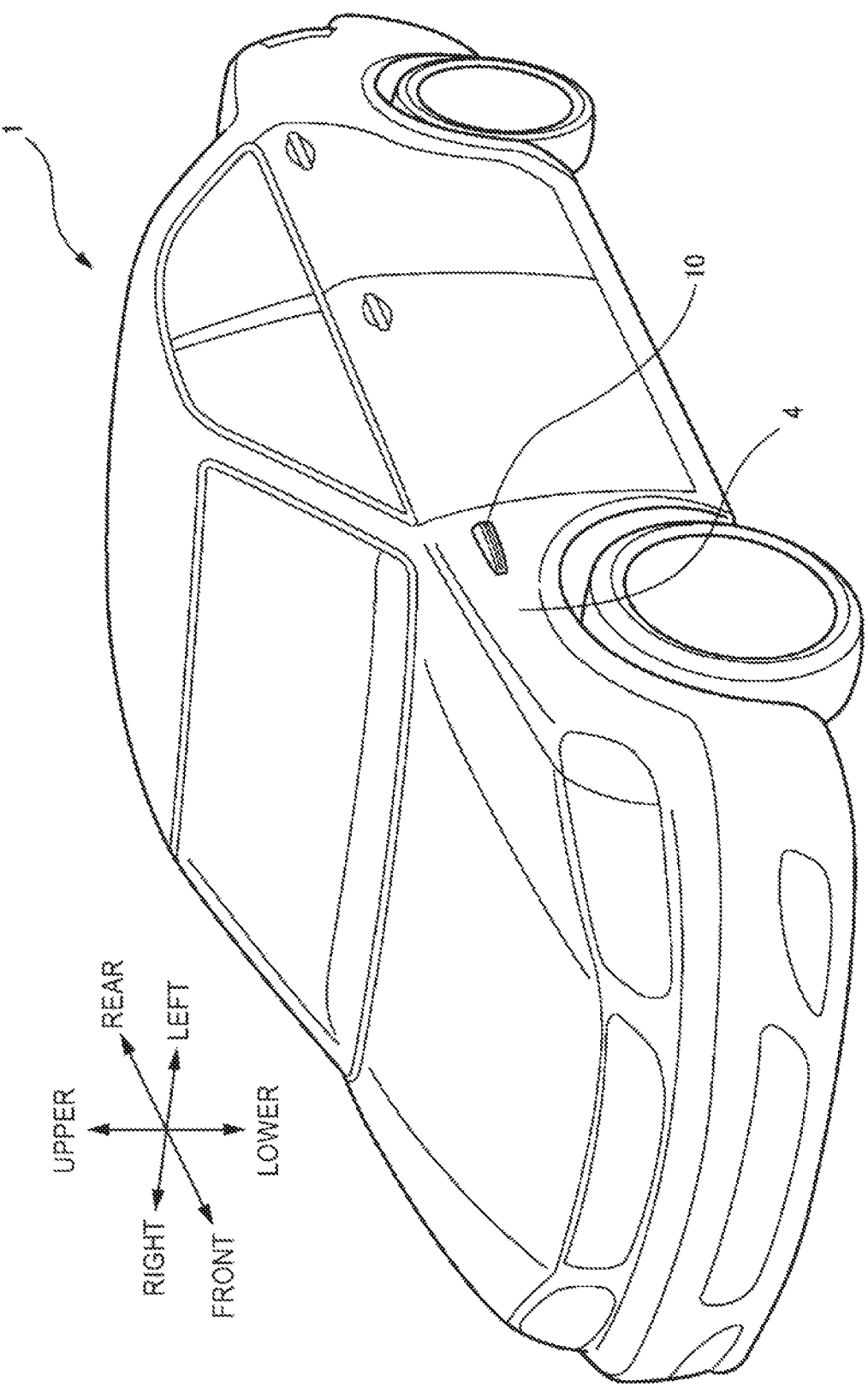
FIG. 1 is a perspective view of a vehicle on which a side turn signal lamp with a camera is mounted.

Hereinbelow, embodiments of the present invention will be described with reference to the drawings. Meanwhile, for the sake of convenience of description, the descriptions of the members having the same reference numerals as the members already described in the present embodiments are omitted. Also, for the sake of convenience of description, dimensions of the respective members shown in the drawings may be different from actual dimensions of the respective members.

Also, in the description of the present embodiments, for the sake of convenience of description, "the right and left direction", "the front and rear direction" and "the upper and lower direction" will be appropriately mentioned. The directions are directions, as seen from a passenger in a vehicle 1 shown in FIG. 1. Here, "the upper and lower direction" is a direction including "the upward direction" and "the downward direction". "The front and rear direction" is a direction including "the forward direction" and "the rearward direction". "The right and left direction" is a direction including "the rightward direction" and "the leftward direction".

FIG. 1 is a perspective view of a vehicle 1 on which a side turn signal lamp 10 with a camera in accordance with the present embodiment is mounted. As shown in FIG. 1, the side turn signal lamp 10 with a camera is provided on a side surface of the vehicle 1. The side turn signal lamp 10 with a camera is provided above left and right tire houses 5, respectively. FIG. 1 depicts the side turn signal lamp 10 with a camera provided on a left side surface of the vehicle 1.

Figure 2:
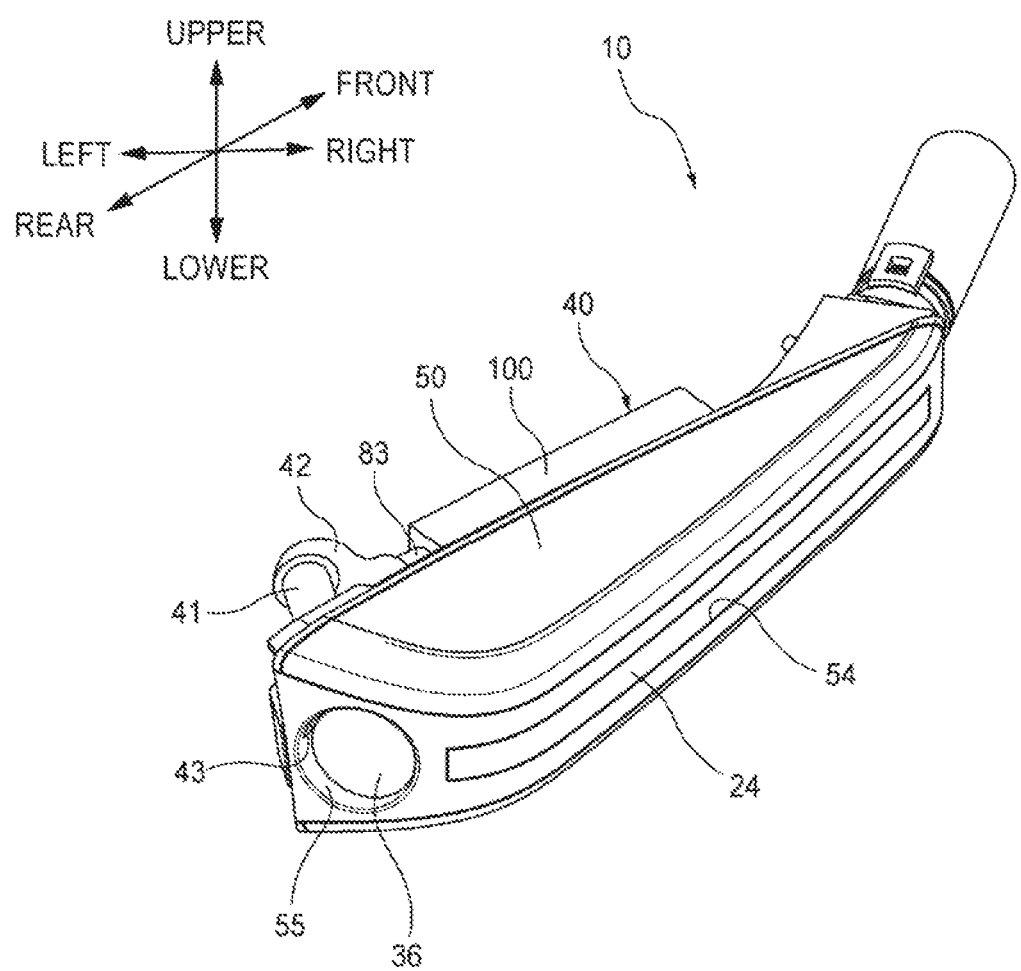
FIG. 2 is a perspective view of a side turn signal lamp with a camera in accordance with a first embodiment.

FIG. 2 is a perspective view of the side turn signal lamp with a camera in accordance with a first embodiment of the present invention. The side turn signal lamp 10 with a camera shown in FIG. 2 is provided on a right side surface of the vehicle 1. The side turn signal lamp 10 with a camera provided on the right side surface of the vehicle 1 is bilaterally symmetrical to the side turn signal lamp 10 with a camera provided on the left side surface of the vehicle 1. FIG. 2 is a perspective view of the side turn signal lamp 10 with a camera, as seen from the rear, and it should be noted the front and rear direction and the right and left direction are reversed to those in FIG. 1.

As shown in FIG. 2, the side turn signal lamp 10 with a camera is configured to emit light from an emission surface 24 toward an outside. Also, the side turn signal lamp 10 with a camera is configured to acquire information about the rear of the vehicle 1 from a camera lens 36. Also, the side turn signal lamp 10 with a camera is configured to clean the camera lens 36 by a cleaning medium discharged from a nozzle 43 by a cleaner unit 40.

The emission surface 24 is provided to be exposed from a slit 54 provided to a cover member 50 and extending in the front and rear direction. The emission surface 24 is provided to extend in the front and rear direction. The emission surface 24 is formed to irradiate light mainly from the slit 54 toward a side of the vehicle 1. More specifically, the emission surface 24 of the side turn signal lamp 10 with a camera provided on the right side surface of the vehicle 1 is configured to irradiate the light mainly toward the right of the vehicle 1. The emission surface 24 of the side turn signal lamp 10 with a camera provided on the left side surface of the vehicle 1 is configured to irradiate the light mainly toward the left of the vehicle 1.

The cover member 50 is provided with a camera opening 55 opening rearward. The side turn signal lamp 10 with a camera is configured to acquire the information about the rear of the vehicle 1 through the camera opening 55. More specifically, a camera unit 30 (refer to FIG. 3) of the side turn signal lamp 10 with a camera provided on the right side surface of the vehicle 1 is configured to acquire information about the rightward oblique rear. A camera unit 30 of the side turn signal lamp 10 with a camera provided on the left side surface of the vehicle 1 is configured to acquire information about the leftward oblique rear.

Figure 3:
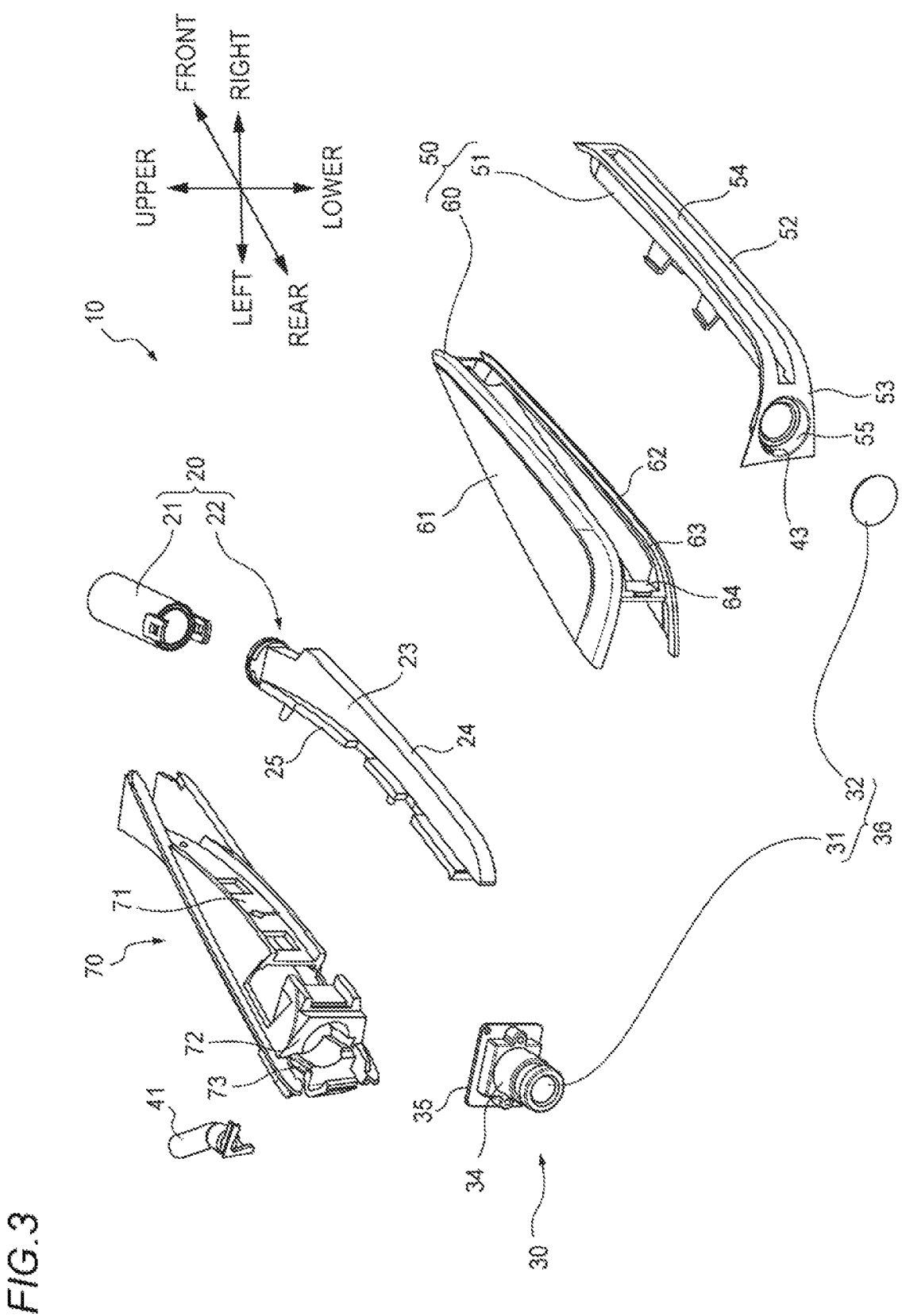
FIG. 3 is an exploded perspective view of the side turn signal lamp with a camera.

FIG. 3 is an exploded perspective view of the side turn signal lamp 10 with a camera shown in FIG. 2. In FIG. 3, only a part of the cleaner unit 40 is shown. As shown in FIG. 3, the side turn signal lamp 10 with a camera includes a light source unit 20, the camera unit 30, the cover member 50, a piping 41, and a base frame 70. The piping 41 is attached to the base frame 70. The nozzle 43 shown in FIG. 2 is provided on a tip end of the piping 41.

The light source unit 20 includes a light source assembly 21, and a light guide body assembly 22. The light source assembly 21 includes a light source (not shown) inside of a cylindrical casing. The light source assembly 21 is configured to house therein the light source, a lens element and the like in a watertight manner. The side turn signal lamp 10 with a camera is attached to the vehicle 1 in such an aspect that the light source assembly 21 is arranged inside of the vehicle 1 with respect to a surface of the vehicle 1.

The light guide body assembly 22 includes a light guide body 23, and a support plate 25. The light guide body assembly 22 is configured so that light generated from the light source is to be incident on the light guide body 23. The light guide body 23 is a member made of transparent resin or the like and extending in the front and rear direction. The light guide body 23 has the emission surface 24 on a side surface extending in the front and rear direction. The light incident on an end portion of the light guide body 23 from the light source unit 20 undergoes repeatedly internal reflection inside of the light guide body 23, and is then emitted from the entire emission surface 24 extending in the front and rear direction.

The camera unit 30 includes a camera lens 36 including an inner lens 31 and an outer lens 32, a camera module 34, and a plate-shaped attachment plate 35 to which the camera module 34 is attached.

The cover member 50 includes a first cover 51 and a second cover 60. The cover member 50 is configured to cover at least a part of the light source unit 20, the camera unit 30, the cleaner unit 40 and the base frame 70 so that at least a part of the members is not exposed to the outside.

The first cover 51 has a side design section 52 facing the side of the vehicle 1, and a rear design section 53 facing the rear of the vehicle 1. The side design section 52 and the rear design section 53 are continuously formed. The side design section 52 is configured to cover a side of the light guide body 23. The side design section 52 is provided with the slit 54 through which the emission surface 24 of the light guide body 23 is laterally exposed.

The rear design section 53 is configured to cover the rear of the camera unit 30 except the camera lens 36. The rear design section 53 is provided with the camera opening 55 opening rearward. The camera opening 55 is provided with the nozzle 43. The rear design section 53 is provided with the nozzle 43 at the rear of the outer lens 32. The nozzle 43 opens toward the outer lens 32, so that the outer lens 32 is cleaned by the cleaning medium discharged from the nozzle 43.

The second cover 60 is mounted with the first cover 51. The second cover 60 has an upper design section 61 facing the upper of the vehicle 1 above the side design section 52, and a lower design section 62 facing the lower of the vehicle 1 below the side design section 52. A first receiving part 63 to which the first cover 51 is mounted is provided between the upper design section 61 and the lower design section 62. The first receiving part 63 is formed as a step recessed toward an inner side of the vehicle 1 from side end portions of the upper design section 61 and the lower design section 62. The first receiving part 63 extends in the front and rear direction. The first receiving part 63 is in contact with a backside of the side design section 52 of the first cover 51. A rear end portion of the first receiving part 63 is provided with a partitioning wall part 64 so as to prevent the light emitted from the light guide body 23 from being incident on the inner lens 31. The partitioning wall part 64e extends in the front and rear direction.

The base frame 70 has integrally a light source attachment part 71 to which the light source unit 20 is attached, a camera attachment part 72 to which the camera unit 30 is attached, and a piping attachment part 73 to which the piping 41 is attached. The base frame 70 is a single component formed by resin integral molding, for example. The side turn signal lamp 10 with a camera is attached to the vehicle 1 in such an aspect that at least a part of the base frame 70 is arranged inside of the vehicle 1 with respect to the surface of the vehicle 1.

Figure 4:
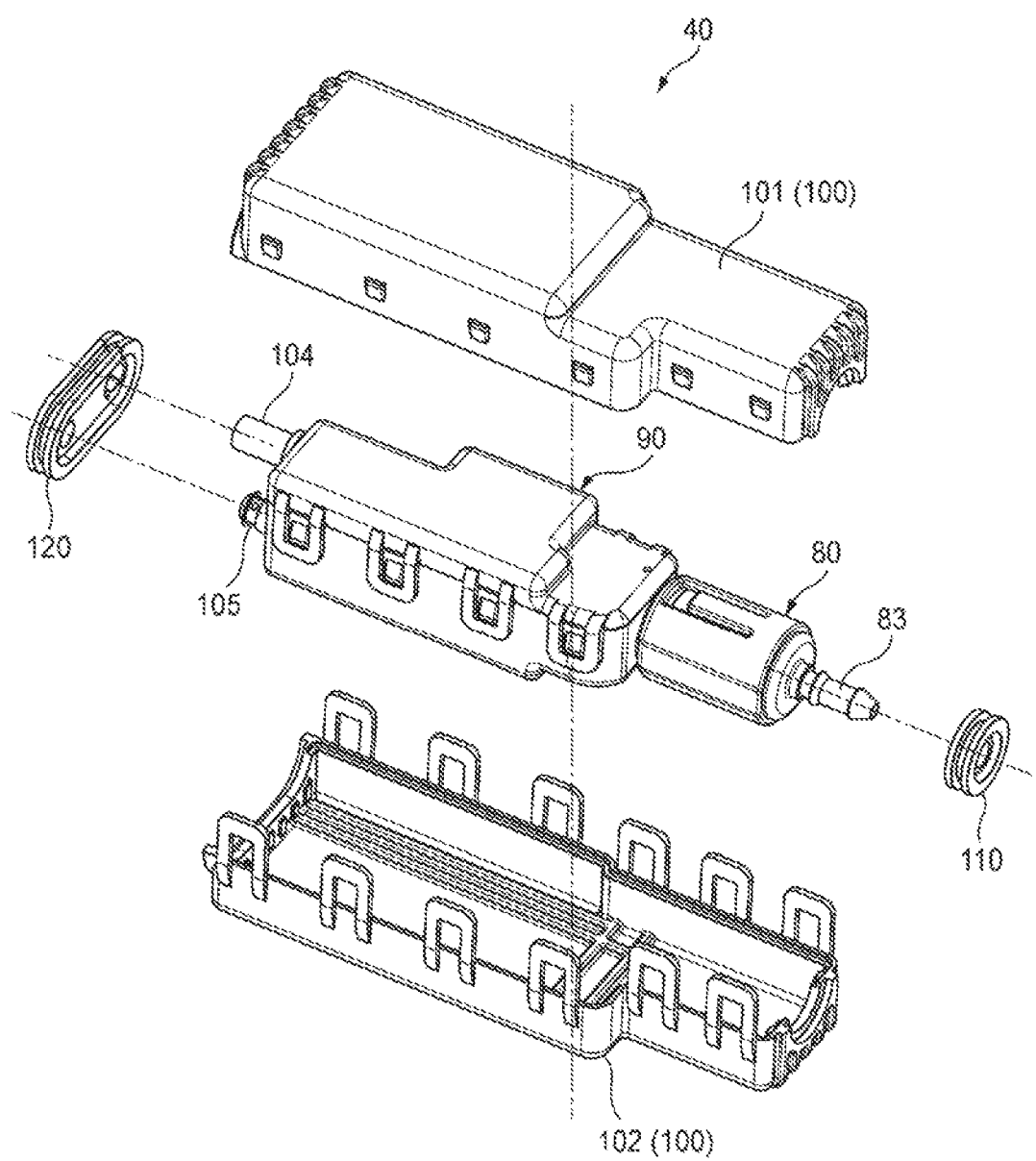
FIG. 4 is an exploded perspective view of a cleaner unit.

FIG. 4 is an exploded perspective view of the cleaner unit 40. As shown in FIG. 4, the cleaner unit 40 includes a cylinder unit 80, a power unit 90, a casing 100 configured by a first casing 101 and a second casing 102, a first rubber member 110, and a second rubber member 120, in addition to the nozzle 43 and the piping 41. The casing 100 is configured to house therein the cylinder unit 80 and the power unit 90.

Figure 5:
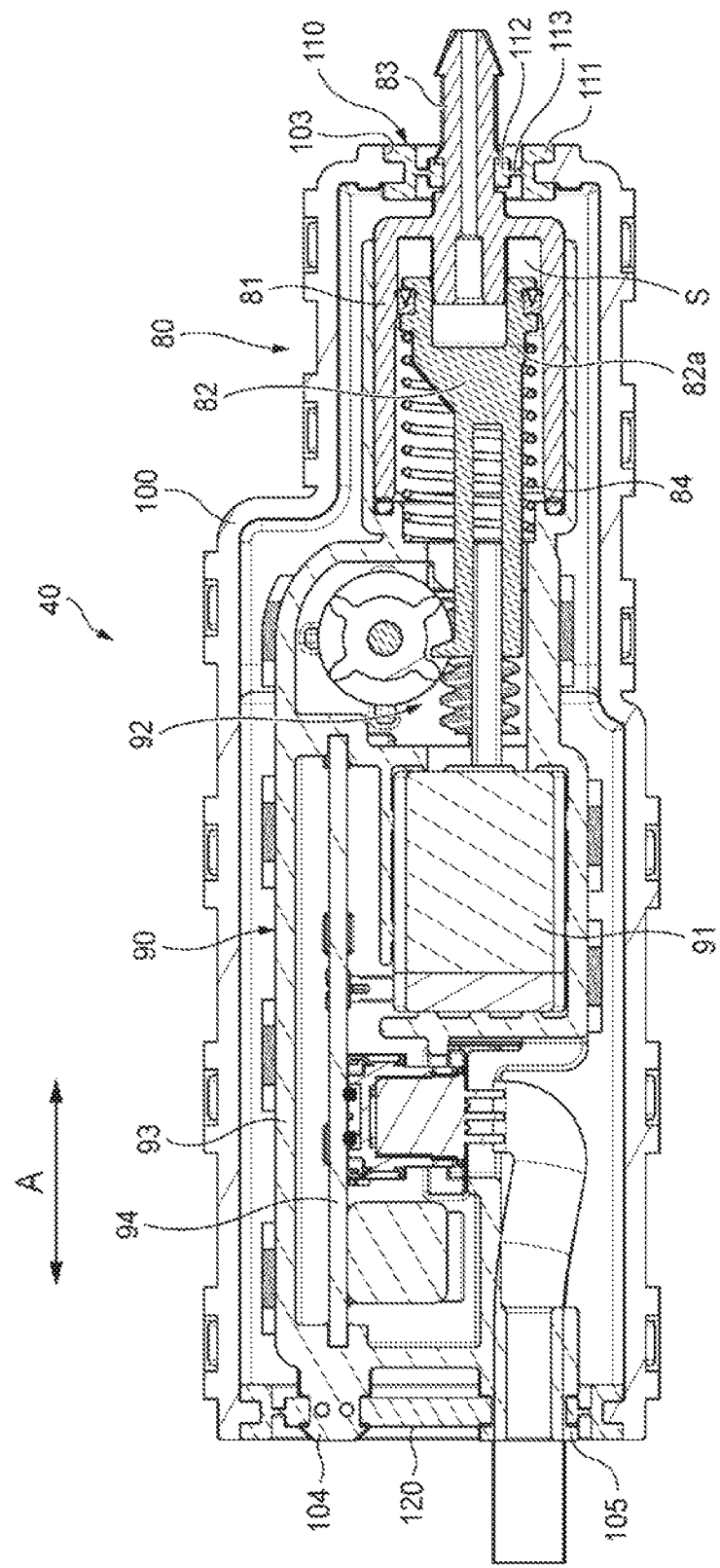
FIG. 5 is a sectional view of the cleaner unit depicting an inside of a casing.

FIG. 5 is a sectional view of the cleaner unit 40 depicting an inside of the casing 100. As shown in FIG. 5, the cylinder unit 80 includes a cylinder 81, and a piston 82 of which one end is configured to reciprocate inside of the cylinder 81.

The cylinder 81 extends in a longitudinal direction, and forms therein a chamber S. An end face of the cylinder 81 in the longitudinal direction is provided with a discharge port 83 through which the chamber S communicates with an outside.

The piston 82 extends in the longitudinal direction of the cylinder 81. One end 82a of the piston 82 is provided in the chamber S. One end 82a of the piston 82 is in contact with an inner surface of the chamber S in a liquid-tight manner. A spring 84 is provided between the piston 82 and the inner surface of the chamber S. The spring 84 urges one end 82a of the piston 82 toward the discharge port 83 all the time.

When the piston 82 is caused to reciprocate, an internal volume formed between one end 82a of the piston 82 and the discharge port 83 of the chamber S changes. When the internal volume decreases as a result of the movement of the piston 82, the cleaning medium filled in the chamber S is discharged from the discharge port 83. In descriptions below, a direction in which the piston 82 reciprocates is referred to as 'reciprocation direction A'. Also, in the first embodiment the cleaning medium is air.

The power unit 90 includes a motor 91, a power transmission mechanism 92, a housing 93, and a circuit board 94 configured to control the motor 91. The housing 93 is configured to house the motor 91 and the power transmission mechanism 92. In the meantime, the shown housing 93 is configured to cover a part of the cylinder 81, too. The power transmission mechanism 92 includes a worm gear, a toothed gear and the like, and is a mechanism configured to transmit power of the motor 91 to the piston 82. The power transmission mechanism 92 is configured to apply the power of the motor 91 to the other side part of the piston 82. An output shaft of the motor 91 is configured to rotate about a rotation axis. The rotation axis is parallel to the reciprocation direction A of the piston 82. Also, the reciprocation direction A of the piston 82 is parallel to the longitudinal direction of the cylinder 81. In the reciprocation direction A, the motor 91, the power transmission mechanism 92, and the cylinder 81 are aligned side by side in corresponding order. The cleaner unit 40 has an elongated shape in the reciprocation direction A.

When the motor 91 is driven, the power transmission mechanism 92 causes the piston 82 to move away from the discharge port 83. In this case, the spring 84 is compressed as the piston 82 is moved. When the piston 82 is moved by a predetermined distance, the power transmission mechanism 92 and the piston 82 are disengaged. Thereby, the piston 82 is vigorously moved toward the discharge port 83 by the compressed spring 84. As a result, one end of the piston 82 reduces the internal volume of the chamber S, so that the cleaning medium inside of the chamber S is vigorously discharged from the discharge port 83.

In the meantime, when the piston 82 repeatedly reciprocates in this way, vibrations and hammering sounds are generated due to the repeat contacts of the piston 82 to the inner surface of the chamber S. When the vibrations are transmitted to the nozzle 43 through the discharge port 83 and a coupling hose 42, a relative position of the nozzle 43 to the camera lens 36 is varied, so that it is difficult to clean the camera lens 36 with accuracy. Also, when the vibrations of the piston 82 cause the side turn signal lamp 10 with a camera to vibrate through the cylinder 81 and the casing 100, an electrical contact point may be damaged, which is not preferable.

Therefore, in the cleaner unit 40 of the first embodiment, the cylinder unit 80 and the power unit 90 are supported to the casing 100 with the rubber members 110 and 120 being interposed therebetween. Specifically, the cylinder unit 80 is supported to the casing 100 with the first rubber member 110 being interposed therebetween, and the power unit 90 is supported to the casing 100 with the second rubber member 120 being interposed therebetween. The rubber members 110 and 120 are elastically deformed to suppress the vibrations of the cylinder unit 80 due to the reciprocation of the piston 82. Thereby, the relative position of the nozzle 43 to the camera lens 36 is difficult to be varied, so that it is possible to easily clean the camera lens 36 with accuracy. Also, even when the cylinder unit 80 is vibrated, the vibration is difficult to be transmitted to the casing 100. For this reason, the casing 100 is difficult to vibrate the side turn signal lamp 10 with a camera.

In the first embodiment, as shown in FIG. 5, the first rubber member 110 has a large-diameter part 111, a small-diameter part 112, and a connection part 113 configured to interconnect the large-diameter part 111 and the small-diameter part 112.

The casing 100 is provided with a first insertion port 103 of which a diameter is greater than the discharge port 83. An outer periphery of the large-diameter part 111 is fitted in the first insertion port 103. An inner periphery of the small-diameter part 112 is fitted in the discharge port 83. The connection part 113 has a narrowed shape thinner than the large-diameter part 111 and, the small-diameter part 112. Stiffness of the connection part 113 is smaller than stiffness of the large-diameter part 111 and the small-diameter part 112, and is thus easily elastically deformed when external force is applied thereto. For this reason, when the piston 82 is in contact with the cylinder 81 and the discharge port 83 is relatively displaced relative to the casing 100, the connection part 113 is elastically deformed, so that vibration transmission from the small-diameter part 112 to the large-diameter part 111 is effectively suppressed.

The second rubber member 120 has also a similar configuration to the first rubber member 110. In the small-diameter part 112 of the second rubber member 120, a first conduit tube 104 and a second conduit tube 105 are inserted. The first conduit tube 104 is configured to communicate an inside and an outside of the casing 100 each other. An electric wiring extending from the circuit board 94 passes through the second conduit tube 105. Thereby, the electric wiring can freely move in the second conduit tube 105. Even when the motor 91 vibrates in conjunction with the reciprocation of the piston 82, since the electric wiring can freely move, excessive force is difficult to be applied to the electric wiring.

The first rubber member 110 is provided between the cylinder unit 80 and the casing 100 on one side (the discharge port 83-side) of the piston 82 with respect to the reciprocation direction A, and the second rubber member 120 is provided between the power unit 90 and the casing 100 on the other side of the piston 82. That is, since the first rubber member 110 and the second rubber member 120 are provided on both sides of the piston 82, which is to reciprocate and is to be thus a vibration generation source, it is possible to effectively suppress the vibrations, which are caused due to the reciprocation of the piston 82.

Figure 6:
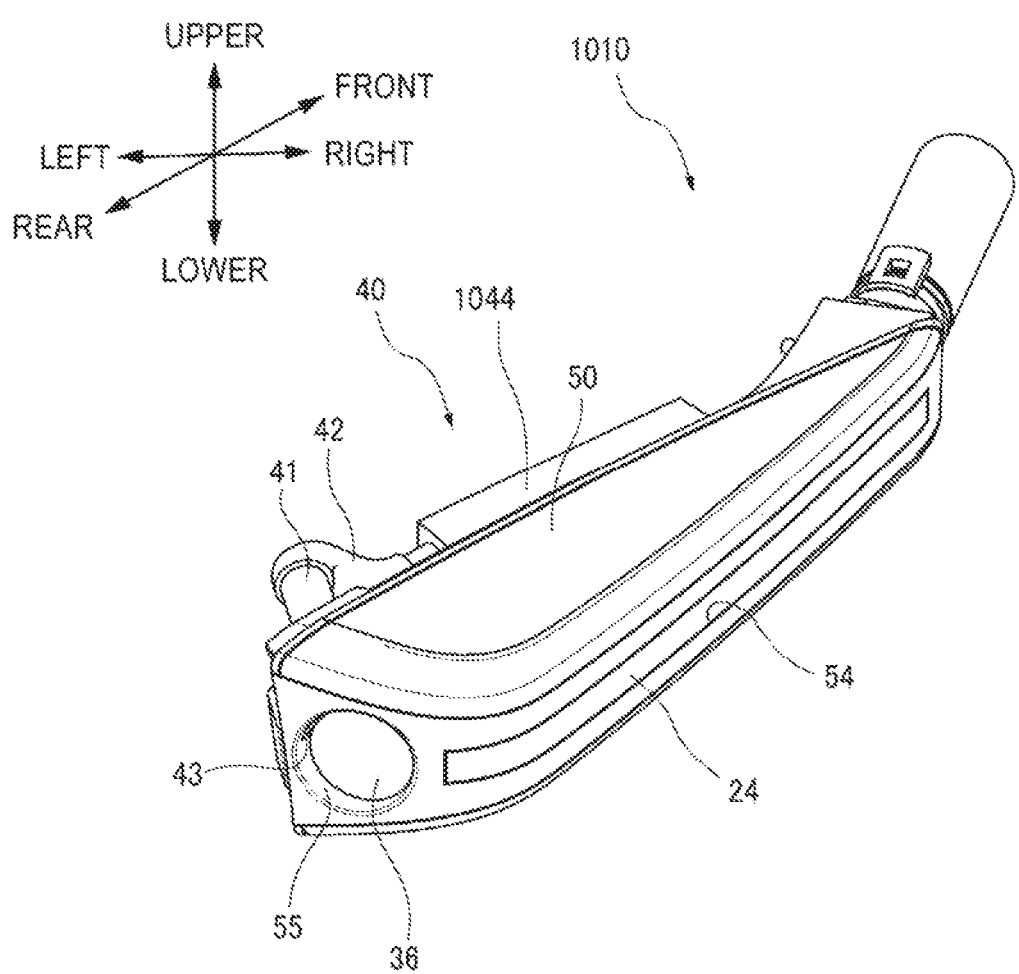
FIG. 6 is a perspective view of a side turn signal lamp with a camera in accordance with a second embodiment.

FIG. 6 is a perspective view of a side turn signal lamp 1010 with a camera in accordance with a second embodiment of the present invention. The reference signs of the respective elements of the side turn signal lamp 1010 with a camera in accordance with the second embodiment are obtained by adding 1000 to the reference signs of the elements of the side turn signal lamp 10 with a camera in accordance with the first embodiment. The elements of the second embodiment common to the first embodiment are denoted with the same reference signs, and the descriptions thereof are omitted as appropriate.

Figure 7:
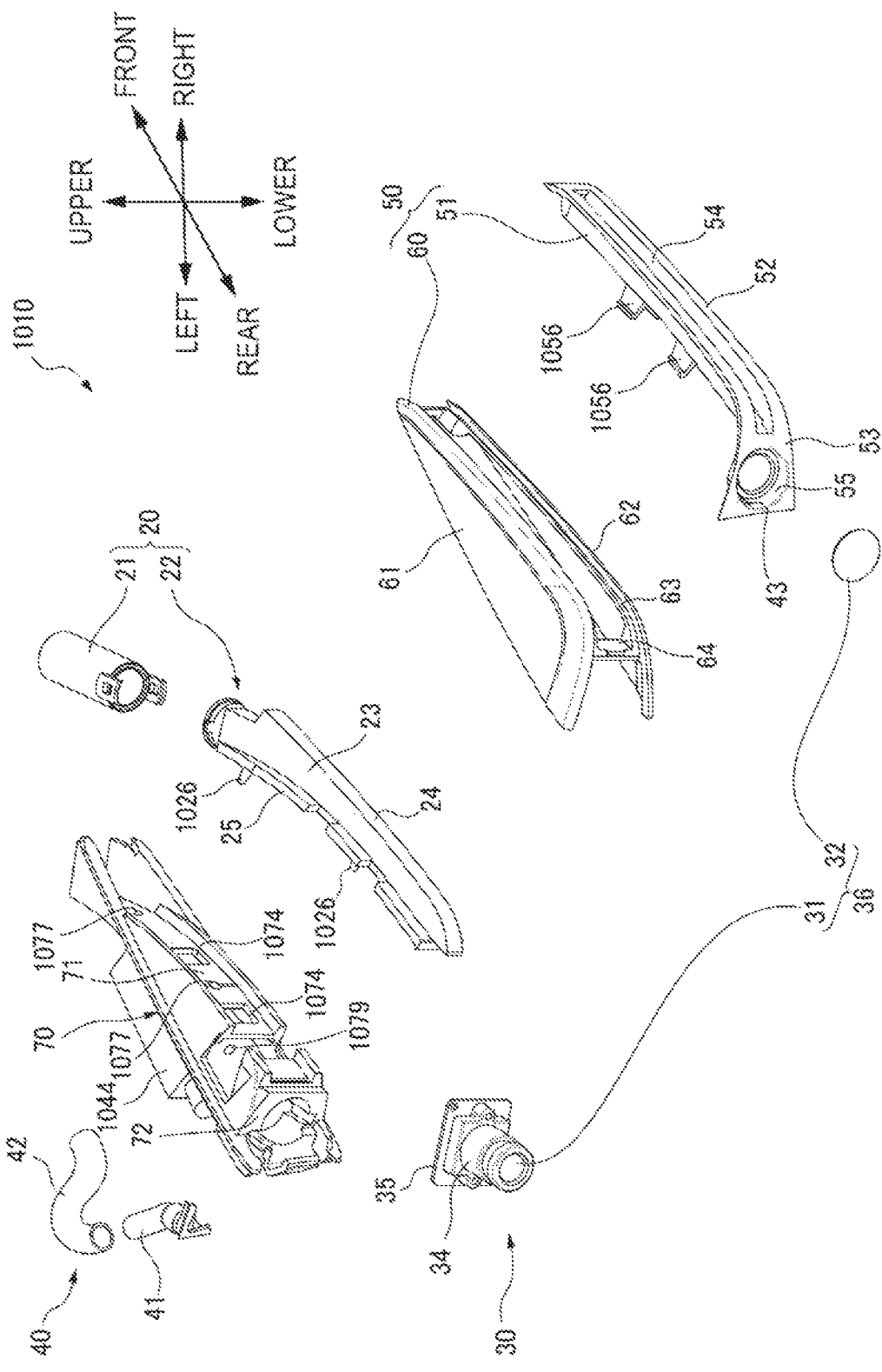
FIG. 7 is an exploded perspective view of the side turn signal lamp with a camera.

FIG. 7 is an exploded perspective view of the side turn signal lamp 1010 with a camera shown in FIG. 6. As shown in FIG. 7, the side turn signal lamp 1010 with a camera includes the light source unit 20, the camera unit 30, the cleaner unit 40, the cover member 50, and the base frame 70.

As shown in FIGS. 6 and 7, the cleaner unit 40 includes a cleaning medium delivery part 1044, a tube path 41, and a coupling hose 42. The cleaning medium delivered from the cleaning medium delivery part 1044 through the tube path 41 is discharged from the nozzle 43 provided to the cover member 50 toward the outer lens 32. The cleaning medium is a cleaning liquid or air, for example.

The side turn signal lamp 1010 with a camera is attached to the vehicle 1 in such an aspect that the cleaning medium delivery part 1044 is arranged inside of the vehicle 1 with respect to the surface of the vehicle 1.

The base frame 70 has integrally the light source attachment part 71 to which the light source unit 20 is attached, the camera attachment part 72 to which the camera unit 30 is attached, and a cleaner attachment screw hole 1079 (an example of a cleaner attachment part) to which the cleaner unit 40 is attached. The base frame 70 is a single component formed by resin integral molding, for example. The side turn signal lamp 1010 with a camera is attached to the vehicle 1 in such an aspect that at least a part of the base frame 70 is arranged inside of the vehicle 1 with respect to the surface of the vehicle 1.

Figure 8:
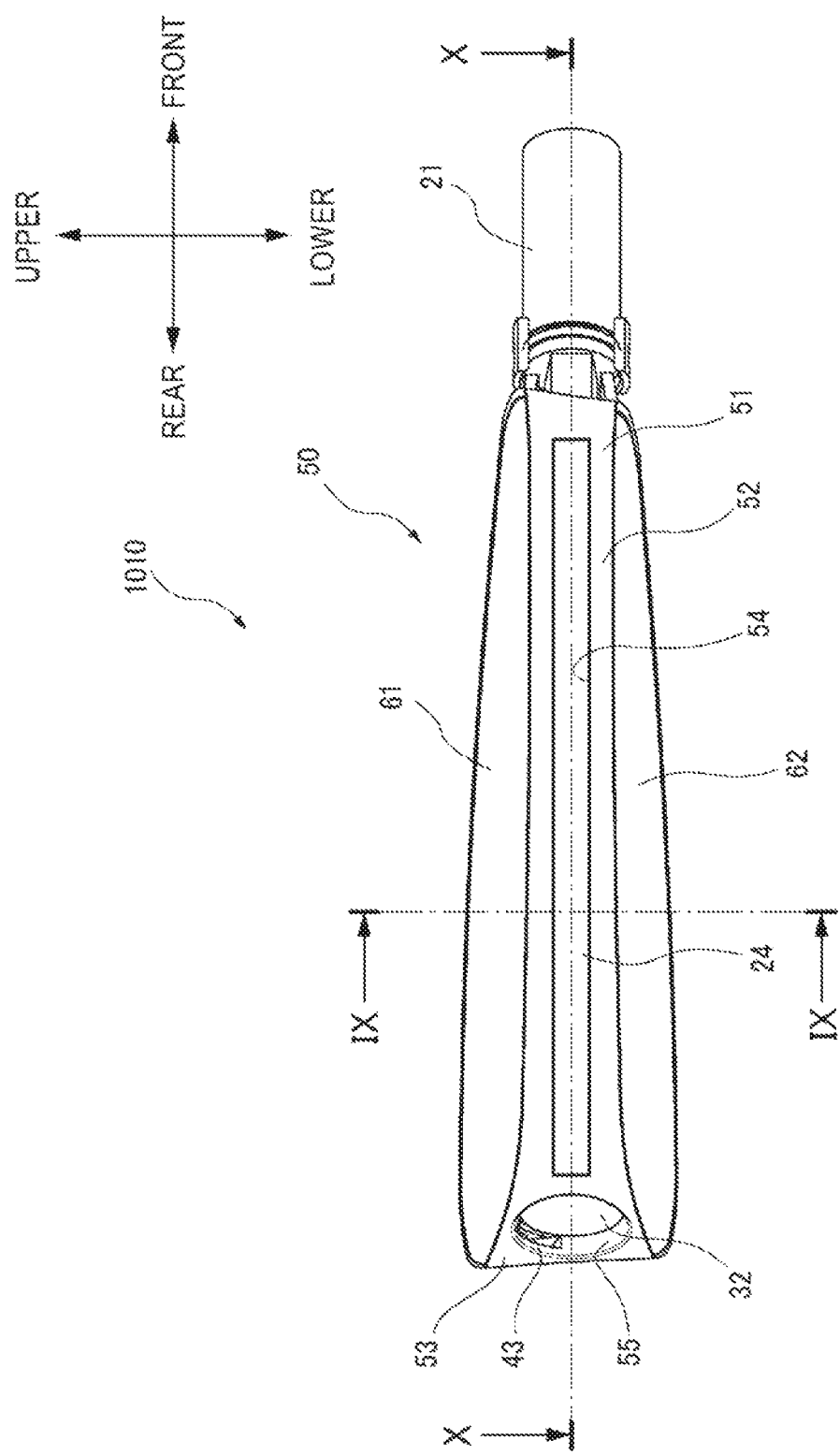
FIG. 8 is a side view of the side turn signal lamp with a camera.
Figure 9:
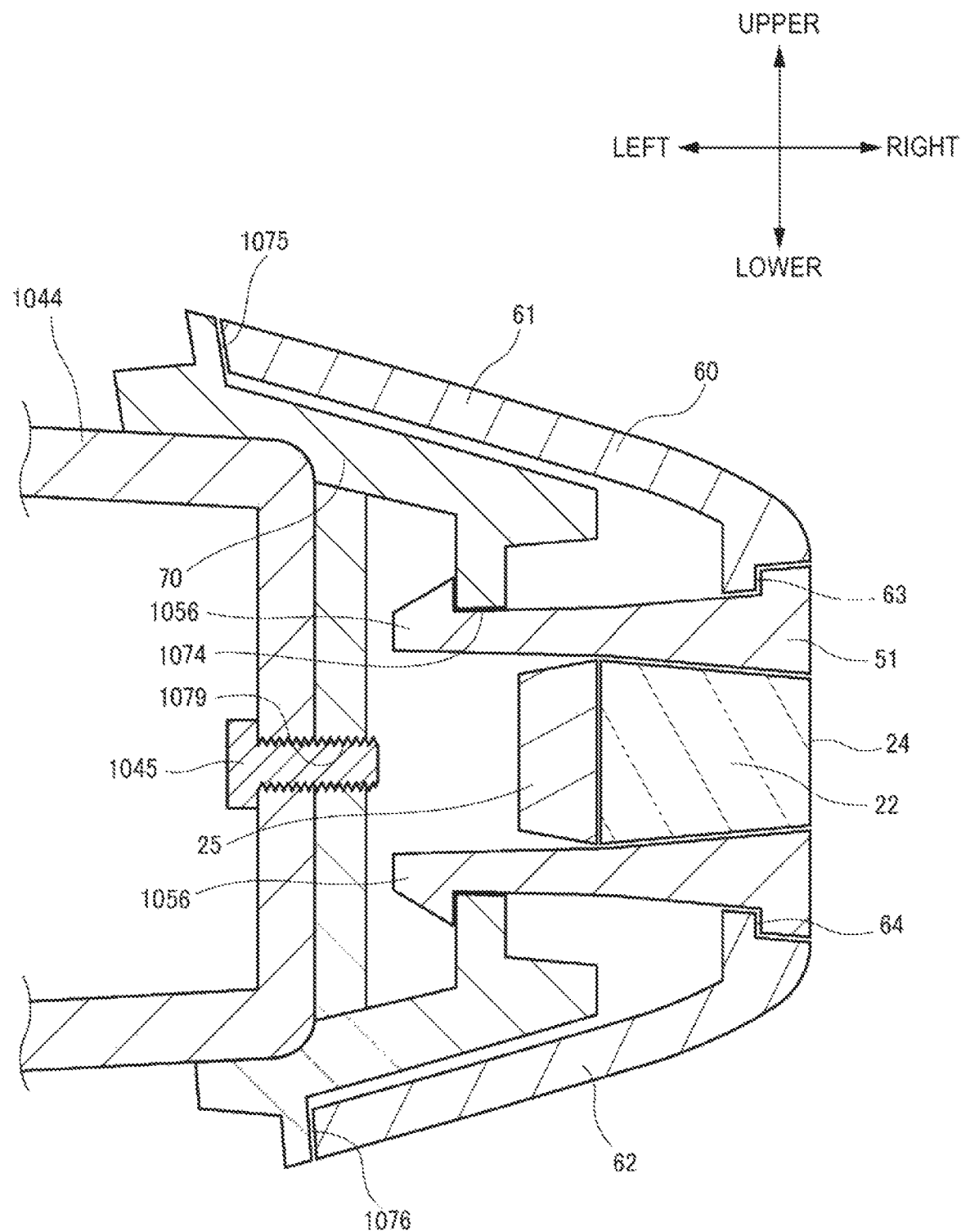
FIG. 9 is a sectional view taken along a line IX-IX of FIG. 8.

FIG. 8 is a side view of the side turn signal lamp 1010 with a camera shown in FIG. 6, as seen from the right. FIG. 9 is a sectional view taken along a line IX-IX of FIG. 8. As shown in FIGS. 7 and 9, the first cover 51 is provided with claws 1056 extending toward the base frame 70. The claws 1056 are inserted in claw insertion holes 1074 formed in the light source attachment part 71 of the base frame 70. The first cover 51 is bonded (snap-fitted) to the base frame 70 by the claws 1056 and the claw insertion holes 1074.

The base frame 70 is provided with an upper receiving part 1075 and a lower receiving part 1076 for supporting the second cover 60. The upper receiving part 1075 is formed to protrude upward. The lower receiving part 1076 is formed to protrude downward. The upper receiving part 1075 is in contact with an end face of the upper design section 61 of the second cover 60. The lower receiving part 1076 is in contact with an end face of the lower design section 62 of the second cover 60.

Also, as shown in FIG. 9, the base frame 70 is provided with a cleaner attachment screw hole 1079 (an example of a cleaner attachment part). The cleaner attachment screw 1045 is attached into the cleaner attachment screw hole 1079, so that the cleaning medium delivery part 1044 is attached to the base frame 70.

Figure 10:
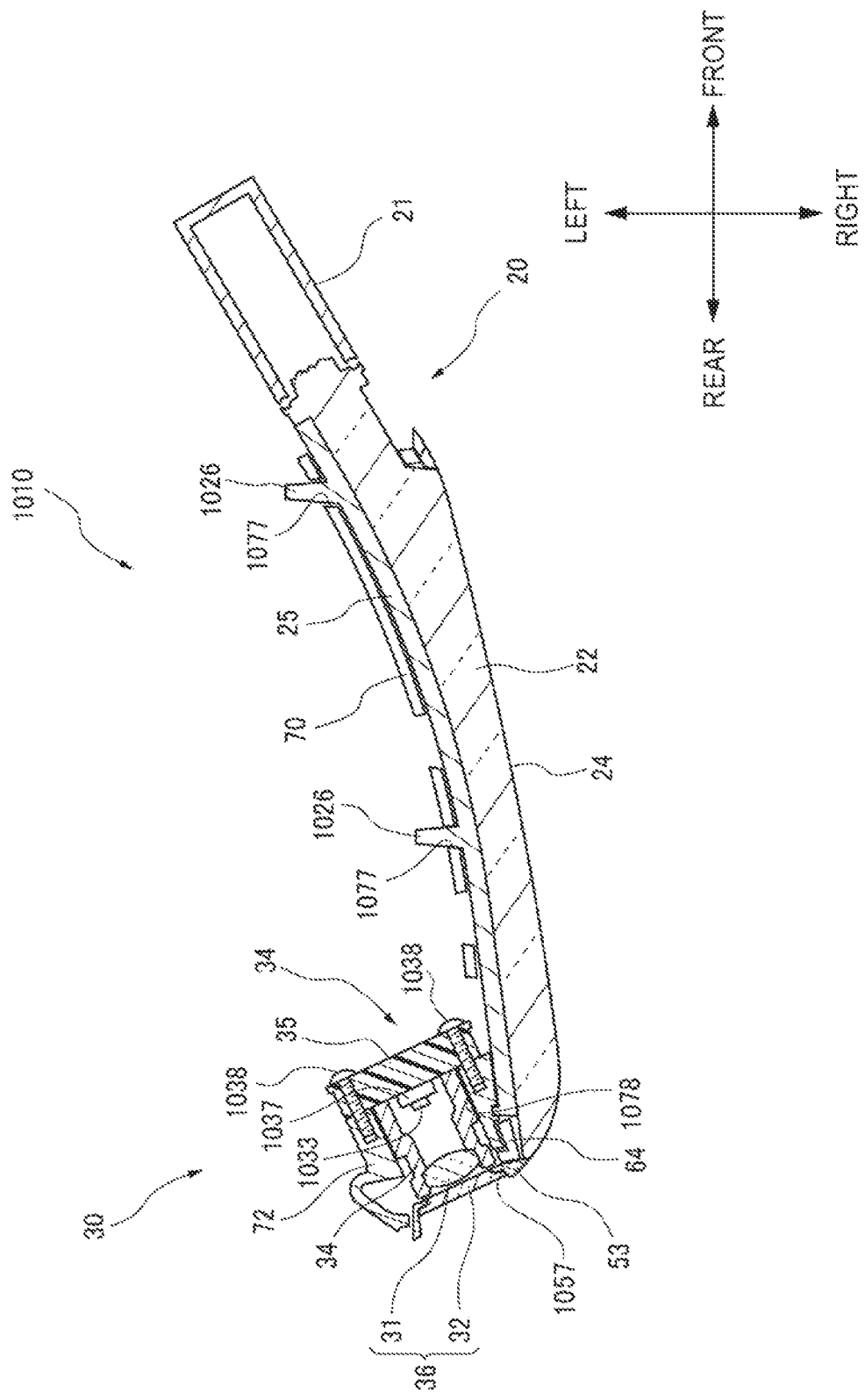
FIG. 10 is a sectional view taken along a line X-X of FIG. 8.

FIG. 10 is a sectional view taken along a line X-X of FIG. 8. As shown in FIG. 10, the support plate 25 extending in the front and rear direction is attached to the light guide body 23. The light guide body 23 is provided with positioning pins 1026 at places spaced in the front and rear direction. The positioning pins 1026 protrude toward an opposite side to the light guide body 23. The two positioning pins 1026 pass through two positioning holes 1077 provided in the base frame 70. Thereby, the light source unit 20 is positioned relative to the base frame 70.

As shown in FIGS. 7 and 10, the camera unit 30 includes the camera lens 36 configured by the inner lens 31 and the outer lens 32, the camera module 34, and the attachment plate 35.

The camera module 34 is a cylindrical member. The inner lens 31 is fitted in the cylindrical camera module 34 in a watertight manner. The other end of the cylindrical camera module 34 is fixed to the attachment plate 35 in a watertight manner. In the cylindrical camera module 34, an imaging element 1033 and a circuit board 1037 having the imaging element 1033 mounted thereon are provided.

The camera unit 30 is attached to the camera attachment part 72 of the base frame 70. The camera attachment part 72 is provided at a rear part of the base frame 70. The camera attachment part 72 is provided with a circular cylindershaped camera hole 1078. In the camera hole 1078, the cylindrical camera module 34 is inserted. A screw 1038 passing through the attachment plate 35 of the camera unit 30 is screwed to the camera attachment part 72, so that the camera unit 30 is attached to the base frame 70.

The rear design section 53 of the first cover 51 is located at the rear of the camera module 34 and the camera attachment part 72. The rear design section 53 is provided with a lens hole 1057 in a position facing the inner lens 31. The outer lens 32 is fixed to the lens hole 1057. In the meantime, the outer lens 32 may be configured to refract incident light from an outside and to guide the same to the inner lens 31 or may be configured to cause incident light from an outside to transmit the inner lens 31, as it is.

As described above, the side turn signal lamp 1010 with a camera in accordance with the second embodiment includes the base frame 70 having integrally the light source attachment part 71, the camera attachment part 72 and the cleaner attachment screw hole 1079. The base frame 70 may be formed by resin integral molding or the like. Since the light source unit 20, the camera unit 30 and the cleaner unit 40 can be integrally attached to the base frame 70, it is possible to facilitate the assembling and to make it difficult for an error to occur during the assembling of components. In particular, since an error is unlikely to occur in the relative position between the nozzle 43 of the cleaner unit 40 and the outer lens 32, the camera unit 30 can obtain a favorable image all the time.

Also, as compared to a configuration in which a component for fixing the light source unit 20, a component for fixing the camera unit 30, and a component for fixing the cleaner unit 40 are respectively provided, it is possible to reduce the number of components of the side turn signal lamp 1010 with a camera, so that it is possible to provide the compact side turn signal lamp 1010 with a camera.

According to the side turn signal lamp 1010 with a camera of the second embodiment, the base frame 70 is formed with a part of the tube path 41 for guiding the cleaning medium from the cleaning medium delivery part 1044 to the nozzle 43. For this reason, a configuration in which a separate member such as a hose for guiding the cleaning medium from the cleaning medium delivery part 1044 to the nozzle 43 is unnecessary or is not used as much as possible is adopted, so that the side turn signal lamp 1010 with a camera can be easily made compact.

The side turn signal lamp 1010 with a camera of the second embodiment includes the cover member 50 configured to cover at least a part of at least one of the light source unit 20 and the base frame 70. For this reason, it is not necessary to provide a shape or surface texture for enhancing design properties on the surface of the light source unit 20 or the base frame 70, and it is possible to facilitate the design of the side turn signal lamp 1010 with a camera having excellent design properties.

In the side turn signal lamp 1010 with a camera of the second embodiment, the outer lens 32 of the camera lens 36 is fixed to the cover member 50, and the cover member 50 is provided with the nozzle 43 configured to discharge the cleaning medium toward the outer lens 32 of the camera lens 36. For this reason, during the assembling, the relative position between the nozzle 43 and the outer lens 32 of the camera lens 36 is difficult to deviate. For this reason, it is possible to easily discharge the cleaning medium from the nozzle 43 toward a targeted position.

In the above embodiment, the cleaner attachment screw 1045 is screwed into the cleaner attachment screw hole 1079 to attach the cleaning medium delivery part 1044 of the cleaner unit 40 to the base frame 70. However, the present invention is not limited thereto.

Figure 11:
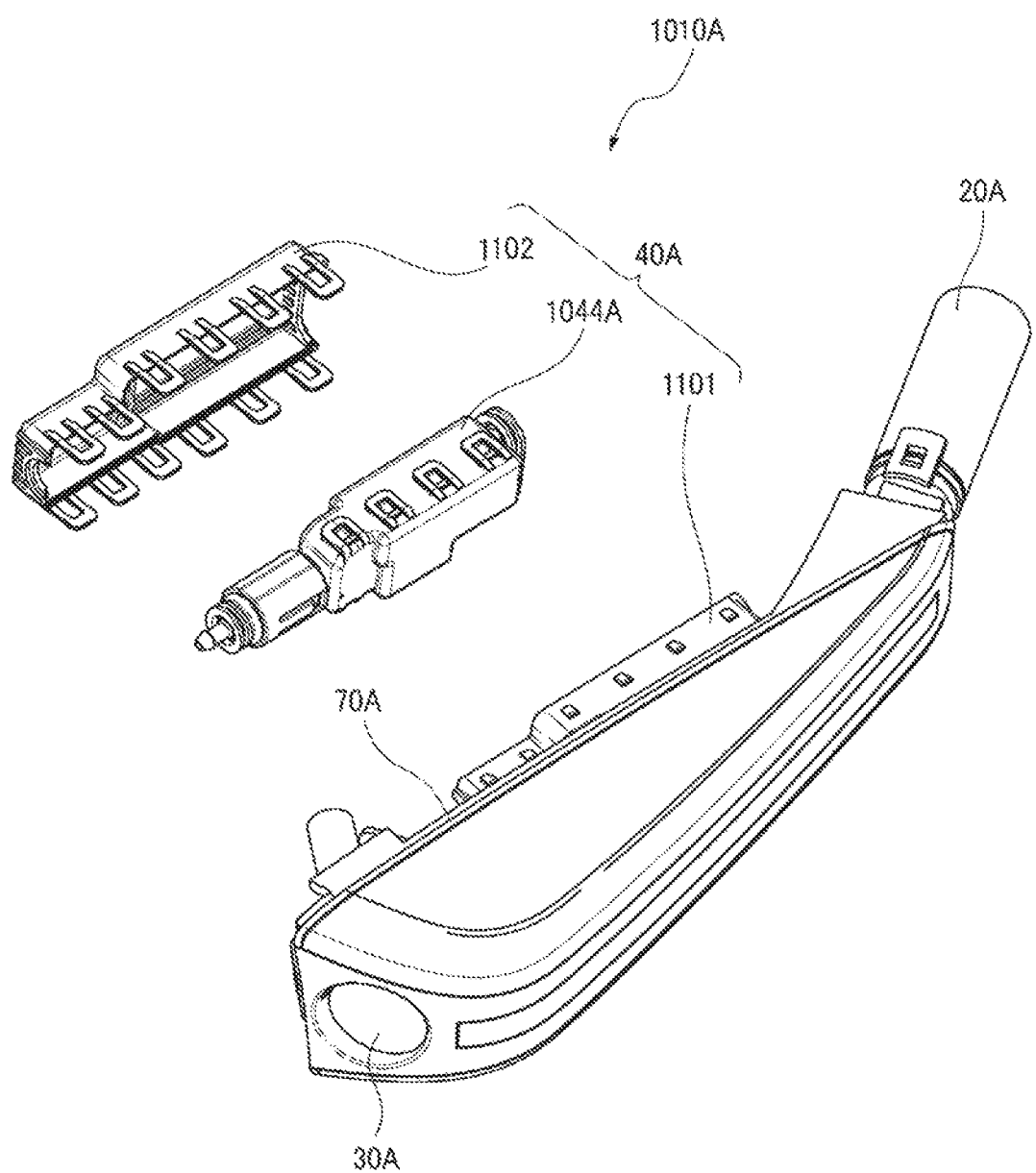
FIG. 11 is an exploded perspective view of a side turn signal lamp with a camera in accordance with a modified embodiment of the second embodiment.

FIG. 11 is an exploded perspective view of a side turn signal lamp 1010A with a camera in accordance with a modified embodiment of the second embodiment. As shown in FIG. 11, the cleaner unit 40A includes a first casing 1101, a second casing 1102, and a cleaning medium delivery part 1044A. In the first casing 1101 and the second casing 1102, the cleaning medium delivery part 1044A is housed. The first casing 1101 is formed integrally with the base frame 70A. The first casing 1101 and the second casing 1102 are coupled by lance coupling. The first casing 1101 functions as a cleaner attachment part.

The side turn signal lamp 1010A with a camera of the present modified embodiment also includes a base frame 70A having integrally the light source attachment part, the camera attachment part, and the cleaner attachment part. For this reason, as with the second embodiment, since a light source unit 20A, a camera unit 30A and a cleaner unit 40A can be integrally attached to the base frame 70A, it is possible to facilitate the assembling and to make it difficult for an error to occur during the assembling of components.

<Various Modified Embodiments>

Although the embodiments of the present invention have been described, the technical scope of the present invention is not construed as being limited to the description of the present embodiments. It can be understood by one skilled in the art that the present embodiments are just exemplary and can be diversely changed within the scope of the invention defined in the claims. The technical scope of the present invention should be determined on the basis of the scope of the invention defined in the claims and the equivalents thereof.

In the above embodiments, the example in which the cleaner unit 40 cleans the outer lens 32 has been described. However, the present invention is not limited thereto. The cleaner unit may be configured to clean the inner lens. Alternatively, in a case in which the camera unit has a camera lens configured by a single component, the cleaner unit may be configured to clean the camera lens.

In the above embodiments, the example in which the side turn signal lamp 10; 1010 with a camera is attached on the side surface of the vehicle 1 above the tire house has been described. However, the present invention is not limited thereto.

The side turn signal lamp 10; 1010 with a camera may be provided on a side surface of a front part configured by a bonnet and the like of the vehicle 1. The side turn signal lamp 10; 1010 with a camera may be provided on a side door of the vehicle 1. The side turn signal lamp 10; 1010 with a camera may be provided on a door mirror of the vehicle 1. The side turn signal lamp 10; 1010 with a camera may be provided on a front pillar or a rear pillar of the vehicle 1. The side turn signal lamp 10; 1010 with a camera, 101 may be provided on a bumper located on a front surface, a side surface or a rear surface of the vehicle 1. The side turn signal lamp 10; 1010 with a camera, 1010 may be provided on a roof. The side turn signal lamp 10; 1010 with a camera 1010 may be provided on a corner part of a boundary between a side surface and a front surface of the vehicle 1. The side turn signal lamp 10; 1010 with a camera may be provided on a corner part of a boundary between a side surface and a rear surface of the vehicle 1.

The subject application is based on Japanese Patent Application Nos. 2017-165450 filed on August 30 and 2017-165451 filed on Aug. 30, 2017, the contents of which are incorporated herein by reference.

The invention claimed is:

1. A vehicle cleaner unit comprising:
a cylinder unit comprising a cylinder configured to form therein a chamber, a discharge port through which the chamber communicates with an outside, and a piston configured to reciprocate inside of the cylinder to discharge from the discharge port a cleaning medium inside of the chamber;
a power unit comprising a motor, a power transmission mechanism configured to transmit rotary motion of the motor to the piston to cause the piston to reciprocate, and a housing configured to house therein the motor and the power transmission mechanism; and
a casing configured to house the cylinder unit and the power unit,
wherein the cylinder unit and the power unit are supported to the casing with a first rubber member and a second rubber member being interposed therebetween,
wherein the first rubber member is provided at one end surface of the casing and the second rubber member is provided at the other end surface of the casing in a reciprocation direction of the piston,
wherein the first rubber member is interposed between the cylinder unit and the casing, and the second rubber member is interposed between the power unit and the casing,
wherein the first rubber member includes:
a first large-diameter part attached to the casing,
a first small-diameter part attached to the cylinder unit, and
a first connection part configured to interconnect the first large-diameter part and the first small-diameter part,
wherein the second rubber member includes:
a second large-diameter part attached to the casing,
a second small-diameter part attached to the power unit, and
a second connection part configured to interconnect the second large-diameter part and the second small-diameter part,
wherein a stiffness of the first connection part is smaller than the stiffness of the first large-diameter part and the stiffness of the first small-diameter part,
wherein the stiffness of the second connection part is smaller than the stiffness of the second large-diameter part and the stiffness of the second small-diameter part,
wherein the first connection part is thinner than the first large-diameter part and the first small-diameter part in the reciprocation direction, and
wherein the second connection part is thinner than the second large-diameter part and the second small-diameter part in the reciprocation direction.

2. The vehicle cleaner unit according to claim 1, wherein a conduit tube through which a wiring extending from the motor is to pass is inserted in at least one of the first rubber member and the second rubber member.

3. The vehicle cleaner unit according to claim 1, wherein the first and second large-diameter parts, the first and second small-diameter parts and the first and second connection parts have a seamless circular shape.

* * * * *